Patented June 9, 1936

2,043,939

UNITED STATES PATENT OFFICE 2,043,939

VULCANIZATION OF RUBBER

Herman R. Thies, Kent, Ohio, assignor to Wingfoot Corporation, Akron, Ohio, a corporation of Delaware No Drawing. Application January 31, 1935, Serial No. 4,311. In Australia July 2, 1932

14 Claims. (Cl. 18—53)

My invention relates to improvements in the vulcanization of rubber. More particularly, it relates to the vulcanization of rubber under conditions such that scorching is reduced or eliminated and desirable properties imparted to the product. It extends both to a new method of vulcanizing and to a new rubber composition.

In the compounding of rubber, it is common practice to break down the rubber and work the desired compounding ingredients into the same on a rubber mill, a treatment which results in the evolution of a considerable amount of heat. With the recent introduction of internal mixing machines, still higher temperatures accompany the compounding operations. In the further processing, particularly the calendering and extruding operations, rather high temperatures are necessary.

In the case of rubber mixes containing the more active organic accelerators, particularly ultra-accelerators, it frequently happens that trouble is caused and loss occasioned by "scorching"; i. e., premature vulcanization resulting from the high temperatures encountered during and after compounding. In some cases, precautions are taken to reduce the danger of scorching by cooling the rubber during the compounding step or immediately thereafter.

My invention provides an improved process of vulcanizing in which the danger of scorching, even with ultra-accelerators, is either minimized or eliminated entirely.

Briefly stated, I have discovered that by the addition of a small percentage of a poly oxy methylene, $(CH_2O)_n$, to a rubber compound containing a semi-ultra or ultra-accelerator, the tendency to scorch below temperatures of about 260 degrees F. is greatly reduced or eliminated without, however, appreciably prolonging the time required for satisfactory vulcanization at higher temperatures.

The poly oxy methylenes may be prepared as described by Pollak in Chem. Zeitung (1913), page 1240, and exist in the alpha, beta, gamma and delta forms. These isomers are crystalline materials and melt in the same range. They differ somewhat in their solubility in water. Of the poly oxy methylenes, alpha poly oxy methylene, melting point 163–168° C. in a closed capillary, appears preferable. It is insoluble in alcohol and ether and has a solubility in water of 11 grams in 100 cc. at 18–25° C.

The amount of a poly oxy methylene which gives rise to the desired elimination or reduction of scorching is small. In some cases, an amount as small as $\frac{1}{10}$ of one percent, based on the rubber, is sufficient; in others, amounts varying up to about three percent, based on the rubber, give excellent results. The amount will be found to vary to some extent with the nature of the mix, and particularly with the nature of the accelerator or accelerators employed.

The more active organic accelerators which tend to cause scorching include both the ultra accelerators and certain active accelerators commonly referred to in the industry as semi-ultra accelerators. Mercaptobenzothiazole, zinc dimethyl dithiocarbamate, the reaction product of mercaptobenzothiazole and diphenylguanidine and the butyraldehyde-aniline condensation product are illustrative of these more active accelerators. These and other accelerators may be used alone or in various admixtures.

In the practice of the invention, the ingredients of the rubber mix may be compounded in the customary manner, either externally on rubber rolls or internally in the Banbury mixer with the incorporation, in either case, of a poly oxy methylene in the mix so that it is present during the mixing operation. The rubber mix containing the poly oxy methylene is stable to a high degree: even though heated to some extent in the mixing apparatus, it nevertheless does not tend to scorch. It can be stored after mixing without the necessity of cooling and without danger of scorching.

My invention will be illustrated by the following examples, indicative of the nature and advantages of the invention. In the tables, the figures under the column "Index Number" are the times in minutes (determined by a solubility test) during which the rubber compounds were heated to give a definite degree of scorch, as hereinafter explained. This test is a simple way of determining the scorch-retarding powers of the poly oxy methylenes.

The index number may be determined by forming pellets from compounded unvulcanized stock, the pellets being about ½ inch in diameter and of uniform thickness. They are then exposed for various lengths of time to a constant temperature (in my tests 99.5 degrees C., a figure representing the average mixing temperature), after which they are removed from the heat and introduced into some inert rubber solvent (for example, a high test gasoline) and allowed to remain for 15 minutes. Thereafter, they are violently agitated for a period of one minute.

If the stock is unscorched, a turbid suspension of rubber compound in gasoline is obtained; as scorching sets in, this turbidity rapidly decreases. The decrease in turbidity is an indication of the degree of scorch and may be measured by ascertaining the height of an obscuring column in an obscurometer, an instrument wherein the observer determines the height of liquid column necessary to obscure a light filament of constant intensity.

One of the commonest tests used by rubber technologists for many years for determining scorch is the so-called "hand-feel" test, in which, by pulling samples of the stock in question and observing its snap or elasticity, its degree of scorch is estimated. It has been found by a comparison of these gasoline solubility tests and hand-feel tests that when the height of obscuring column measures 100 mm., the scorching as measured by the "hand-feel" tests is barely perceptible. My index number is the time in minutes of heating at 99.5 degrees C. at which the stock, when subjected to the gasoline solubility tests, gave a height of obscuring column of 100 mm.

It will also be seen from the tensile and elongation figures that the use of these poly oxy methylenes does not interfere with the curing properties of the stock. In certain cases, the values are even increased. It is of course necessary for best results, as has been pointed out above, to use varying small amounts of a poly oxy methylene for different rubber mixes, particularly for different accelerators. The optimum amount is best arrived at by experimentation.

The following examples give the results obtained with the use of mercaptobenzothiazole, an accelerator which is not commonly considered to be an ultra-accelerator, but which, unless special precautions are taken, has a tendency to cause scorching. Although nearly any of the standard rubber formulae may be employed, the following, selected for the sake of simplicity, has been found to be suitable.

|  | Parts by weight |
|---|---|
| Rubber (smoked sheet) | 50.00 |
| Rubber (pale crepe) | 50.00 |
| Zinc oxide | 10.00 |
| Pigment | 10.00 |
| Sulphur | 3.00 |
| Mercaptobenzothiazole | 1.00 |

In this compound, the pigment actually employed was "Rubber Yellow #4", a yellow pigment produced by the Federal Color Laboratory. Its use was simply to facilitate the determination of the index number.

To portions of this rubber stock was then added one part by weight of alpha poly oxy methylene, after which index numbers were determined as above outlined and the customary rubber tensile and elongation tests obtained. A control containing no retarder was tested along with the examples containing one part by weight of the alpha poly oxy methylene.

| Alpha poly oxy methylene | Ult. tens kg./cm.² | | Max. elong. in percent | | Index number at 99.5° C. | |
|---|---|---|---|---|---|---|
|  | Specimen | Control | Specimen | Control | Specimen | Control |
| Test #1 | 194 | 185 | 765 | 765 | 61 | 33 |
| Test #2 |  |  |  |  | 81 | 40 |

It is therefore readily seen by comparison of the respective index numbers for alpha poly oxy methylene and its control that the tendency of the stocks to scorch is greatly retarded by the presence thereof. Likewise, it is noted that the tensiles and elongations are somewhat higher than those of the control.

The following example gives the scorching results obtained with the ultra-accelerator zinc dimethyl dithiocarbamate. As with mercaptobenzothiazole, zinc dimethyl dithiocarbamate may be used with nearly any of the standard rubber formulae, the following being selected for purposes of simplicity:

|  | Parts by weight |
|---|---|
| Rubber (pale crepe) | 50.00 |
| Rubber (smoked sheet) | 50.00 |
| Zinc oxide | 10.00 |
| Pigment | 10.00 |
| Sulphur | 3.00 |
| Zinc dimethyl dithiocarbamate | .40 |

To portions of this compound was added one part of alpha poly oxy methylene. Physical properties and scorch tests were obtained as above outlined for mercaptobenzothiazole. Results were as follows:

| Material | Ultimate tensile | Maximum elong. | Index No. mins. to scorch at 99.5° C. |
|---|---|---|---|
| Control | 224 | 770 | 20 |
| Alpha poly oxy methylene | 204 | 765 | 81 |

It is evident that the control stock is a fast low temperature curing compound and has a decided tendency to scorch. The addition of alpha poly oxy methylene results in a marked decrease in the scorching tendency of the stock, changing it from a stock impracticable to handle in the factory to one of the same physical properties which can be handled with little or no trouble.

Another example demonstrating the scorch retarding properties of the poly oxy methylenes is found in the following tests conducted with a compound containing butyraldehyde-aniline (Du Pont 808) as the accelerator. Inasmuch as the latter is a high temperature accelerator, these trials were made with the adaptation of the scorch test formula to obtain optimum cures at 310 degrees F. The compound used is as follows:

|  | Parts by weight |
|---|---|
| Rubber (smoked sheet) | 50.00 |
| Rubber (pale crepe) | 50.00 |
| Zinc oxide | 10.00 |
| Sulphur | 2.50 |
| Accelerator | 1.25 |

To this basic formula, one part by weight of alpha poly oxy methylene was added and after uniform mixing the stock was cured at 310 degrees F. and subjected to physical tests. Index numbers also were obtained on the unvulcanized stock by the method outlined above. Results were as follows:

| Material | Ultimate tensile in kgs./cm.² | | Max. elong. in percent | | Index number 99.5° C. | |
|---|---|---|---|---|---|---|
|  | Specimen | Control | Specimen | Control | Specimen | Control |
| Alpha poly oxy methylene | 255 | 266 | 750 | 800 | 81 | 50 |

From the foregoing examples, which illustrate the improved process of my invention, it will be seen that the addition of a small portion of a poly oxy methylene to the rubber mix effectively prevents scorching at temperatures ordinarily met with in the milling of the rubber prior to vulcanization and that a poly oxy methylene added to the stock does not interfere with the vulcanization of the rubber at higher temperatures. The unvulcanized stock is stable and can be kept without the necessity of cooling it to a low temperature and without the danger of self-vulcanization during storage.

Another advantage of my invention is apparent in rubber cements which are commonly used in various manufacturing processes, in particular those cements which are self-curing or air-curing. One of the main difficulties has been the gelling, or setting up, of the self-curing cement a short time after the preparation of the mixture, making it necessary to use these cements within a very short time. By the use of a poly oxy methylene, this gelling is greatly retarded.

Another advantageous use of my invention lies in the decreased amounts of softener required in rubber stocks. Heretofore, it has been necessary in processing to use various percentages of certain rubber softeners, such as pine tar and pine oil, which supposedly by their softening action render the stocks less "scorchy". These softeners, however, detract from the quality of the rubber compound, especially in abrasive resistance, and the more the softener, the less the quality as a general rule. By the use of a poly oxy methylene, smaller amounts of softeners may be used, the stocks being capable of processing at somewhat higher temperatures without the usual dangers of scorching.

Still another advantage lies in their use in highly compounded, heavily-loaded stocks wherein they increase materially the hardness and resistance to bending, qualities difficult, or even impossible, to obtain in many stocks without sacrificing other preferred qualties. In rubber flooring, sole, toplift and bead stocks these qualities are particularly desired.

From the foregoing it will be seen that my invention is of general application in the vulcanization of rubber compounds, whether or not containing the usual compounding ingredients such as reinforcing pigments, activators, softeners, antioxidants, etc., all or any of which may be employed advantageously. It is of course desirable, although not strictly necessary, to determine by test the preferred amounts in each case. It will be understood that numerous changes may be made in the invention without departing from the spirit thereof. It is intended that the patent shall cover, by suitable expression in the appended claims, whatever features of patentable novelty reside in the invention herein disclosed.

This application is in part a continuation of application Serial No. 620,734, filed July 2, 1932.

What I claim is:

1. A vulcanizable rubber composition retarded as to vulcanization at prevulcanization temperatures and vulcanizable at elevated temperatures, including a vulcanizing agent, a semi-ultra or ultra accelerator, and alpha poly oxy methylene.

2. A process of treating a vulcanizable rubber mix containing a vulcanizing agent, a metallic oxide and a benzothiazyl sulphide semi-ultra or ultra accelerator, for retarding or inhibiting the prevulcanization thereof, and permitting vulcanization at elevated temperatures, consisting in incorporating in the mix alpha poly oxy methylene.

3. A process of treating a vulcanizable rubber mix containing an accelerator selected from the group consisting of mercaptobenzothiazole, zinc dimethyl dithiocarbamate and the butyraldehyde-aniline condensation product prepared according to the process outlined in Patent No. 1,780,334, for retarding or inhibiting the prevulcanization thereof and permitting vulcanization at elevated temperatures, consisting in incorporating in the mix alpha poly oxy methylene.

4. A vulcanizable rubber composition retarded as to vulcanization at prevulcanization temperatures and vulcanizable at elevated temperatures, including a vulcanizing agent, a benzothiazyl sulphide semi-ultra or ultra accelerator, and alpha poly oxy methylene.

5. A vulcanizable rubber composition retarded as to vulcanization at prevulcanization temperatures and vulcanizable at elevated temperatures, including a vulcanizing agent, a mercaptobenzothiazole semi-ultra or ultra accelerator, and alpha poly oxy methylene.

6. A vulcanizable rubber composition retarded as to vulcanization at prevulcanization temperatures and vulcanizable at elevated temperatures, including a vulcanizing agent, a dithiocarbamate semi-ultra or ultra accelerator, and alpha poly oxy methylene.

7. A vulcanizable rubber composition retarded as to vulcanization at prevulcanization temperatures and vulcanizable at elevated temperatures, including a vulcanizing agent, an aldehyde amine semi-ultra or ultra accelerator, and alpha poly oxy methylene.

8. A process of treating a vulcanizable rubber mix containing a semi-ultra or ultra accelerator for retarding or inhibiting the prevulcanization thereof and permitting vulcanization at elevated temperatures consisting in incorporating in the mix alpha poly oxy methylene.

9. A process of treating a vulcanizable rubber mix containing a dithiocarbamate semi-ultra or ultra accelerator for retarding or inhibiting the prevulcanization thereof and permitting vulcanization at elevated temperatures consisting in incorporating in the mix alpha poly oxy methylene.

10. A process of treating a vulcanizable rubber mix containing an aldehyde amine semi-ultra or ultra accelerator for retarding or inhibiting the prevulcanization thereof and permitting vulcanization at elevated temperatures consisting in incorporating in the mix alpha poly oxy methylene.

11. A process of treating a vulcanizable rubber mix containing a semi-ultra or ultra accelerator for retarding or inhibiting the prevulcanization thereof and permitting vulcanization at elevated temperatures consisting in incorporating in the mix a poly oxy methylene.

12. A vulcanizable rubber composition retarded as to vulcanization at prevulcanization temperatures and vulcanizable at elevated temperatures, including a vulcanizing agent, a benzothiazyl sulphide semi-ultra or ultra accelerator, and a poly oxy methylene.

13. A process of treating a vulcanizable rubber mix containing a vulcanizing agent, a metallic oxide and a benzothiazyl sulphide semi-ultra or ultra accelerator, for retarding or inhibiting the prevulcanization thereof, and permitting vulcanization at elevated temperatures, consisting in incorporating in the mix a poly oxy methylene.

14. A vulcanizable rubber composition retarded as to vulcanization at prevulcanization temperatures and vulcanizable at elevated temperatures, including a vulcanizing agent, a semi-ultra or ultra organic accelerator, and a poly oxy methylene.

HERMAN R. THIES.